US012082073B2

(12) United States Patent
Morita et al.

(10) Patent No.: US 12,082,073 B2
(45) Date of Patent: Sep. 3, 2024

(54) POSITION ESTIMATION APPARATUS, POSITION ESTIMATION SYSTEM, AND POSITION ESTIMATION METHOD

(71) Applicant: Panasonic Intellectual Property Management Co., Ltd., Osaka (JP)

(72) Inventors: Junichi Morita, Tokyo (JP); Naganori Shirakata, Kanagawa (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 338 days.

(21) Appl. No.: 17/588,017

(22) Filed: Jan. 28, 2022

(65) Prior Publication Data

US 2022/0150669 A1     May 12, 2022

Related U.S. Application Data

(63) Continuation of application No. PCT/JP2020/029137, filed on Jul. 29, 2020.

(30) Foreign Application Priority Data

Aug. 2, 2019   (JP) ................................ 2019-143113

(51) Int. Cl.
    *H04W 4/029*     (2018.01)
    *G01S 5/06*     (2006.01)
    *H04B 17/318*     (2015.01)

(52) U.S. Cl.
    CPC ............... *H04W 4/029* (2018.02); *G01S 5/06* (2013.01); *H04B 17/318* (2015.01)

(58) Field of Classification Search
    None
    See application file for complete search history.

(56) References Cited

FOREIGN PATENT DOCUMENTS

| JP | 2002-300652 | A | 10/2002 | |
|----|----|----|----|----|
| JP | 2002300652 | * | 10/2002 | ............. G06F 13/00 |
| JP | 2008-241684 | A | 10/2008 | |
| JP | 4973378 | B2 | 7/2012 | |
| JP | 2017531169 | * | 10/2017 | ......... G01S 5/02524 |

OTHER PUBLICATIONS

International Search Report, mailed Oct. 13, 2020, for International Application No. PCT/JP2020/029137. (4 pages with English translation).

* cited by examiner

*Primary Examiner* — Adolf Dsouza
(74) *Attorney, Agent, or Firm* — Seed IP Law Group LLP

(57) ABSTRACT

A selection circuit selects, as anchors, at least two of a plurality of radio electronic devices and updates the selected anchors based on first information and second information, the anchors being used for position estimation for a mobile terminal, the first information being related to an arrangement of the radio electronic devices, the second information being related to a first position resulting from estimation of a position of the mobile terminal, using the selected anchors. A estimation circuit estimates the first position of the mobile terminal based on third information related to radio communication quality between the selected anchors and the mobile terminal and on the first information related to the selected anchors, and estimates a second position of the mobile terminal based on fourth information related to radio communication quality between the updated anchors and the mobile terminal and on the first information related to the updated anchors.

7 Claims, 13 Drawing Sheets

FIXTURE POSITION INFORMATION
121

| FIXTURE IDENTIFIER | INSTALLATION POSITION |
|---|---|
| 30-1 | (Xa1,Ya1) |
| 30-2 | (Xa2,Ya2) |

501 — FIXTURE IDENTIFIER
502 — INSTALLATION POSITION

FIG. 5

POSITION ESTIMATION APPARATUS, POSITION ESTIMATION SYSTEM, AND POSITION ESTIMATION METHOD

TECHNICAL FIELD

The present disclosure relates to a position estimation apparatus, a position estimation system, and a position estimation method.

BACKGROUND ART

A technique utilizing a radio node with a known installation position has been known in order to estimate a position of a terminal in, for example, a building where positioning signals from a satellite positioning system (e.g., Global Positioning System (GPS)) is hard to reach. In one example, Patent Literature (hereinafter referred to as "PTL") 1 discloses a technique estimating the location of the terminal with high accuracy by selecting the number of radio nodes (hereinafter referred to as "anchor") used in location estimation of the terminal based on the reliability of the anchor. Specifically, PTL 1 discloses repetition of the following processes of: estimating the location of the terminal by using a plurality of anchors; calculating the reliability of each of the anchors by using the estimated location; and estimating again the location of the terminal by using a plurality of anchors excluding anchors with low reliability.

CITATION LIST

Patent Literature

PTL1
Japanese Patent Application Laid-Open No. 2008-241684

SUMMARY OF INVENTION

However, in the technique disclosed in PTL 1, the above-described processes are repeated, which takes a long time to estimate the position of the terminal.

One non-limiting and exemplary embodiment of the present disclosure facilitates providing a technique for shortening the time required for estimating a position of a terminal, using radio.

A position estimation apparatus according to an aspect of the present disclosure includes: a selection circuit that selects, as anchors, at least two of a plurality of radio electronic devices arranged in a region and updates the selected anchors based on first information and second information, the anchors being used for position estimation for a mobile terminal, the first information being related to an arrangement of the plurality of radio electronic devices, the second information being related to a first position resulting from estimation of a position of the mobile terminal in the region, using the selected anchors; and an estimation circuit that estimates the first position of the mobile terminal based on third information related to radio communication quality between the selected anchors and the mobile terminal and on the first information related to the selected anchors, and estimates a second position of the mobile terminal based on fourth information related to radio communication quality between the updated anchors and the mobile terminal and on the first information related to the updated anchors.

It should be noted that general or specific embodiments may be implemented as a system, an apparatus, a method, an integrated circuit, a computer program, a storage medium, or any selective combination thereof.

According to a non-limiting embodiment of the present disclosure, it is possible to shorten the time required for estimating a position of a terminal, using radio.

Additional benefits and advantages of an aspect of the present disclosure will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 5 illustrates an example of fixture position information according to the embodiment;

DESCRIPTION OF EMBODIMENTS

Hereinafter, an embodiment according to the present disclosure will be described in detail with reference to the accompanying drawings. Note that: the embodiment described below is an example; and the present disclosure is not limited by the embodiment.

In recent years, introduction of lighting fixtures supporting radio communication into commercial facilities and/or the like has been increasing. One of the advantages of a lighting fixture supporting the radio communication is its "simple operation." For example, via the radio communication, operations such as turning on and off as well as dimming of a designated lighting fixture can be easily performed from a device at hand (e.g., remote controller).

Since lighting fixtures are fixedly installed on a ceiling and the like during, for example, construction of a building, installation positions of the lighting fixtures are known. Thus, it is conceivable to utilize lighting fixtures supporting the radio communication as anchors for estimating positions of terminals carried by persons in the building (or terminals provided on mobile objects). This reduces labor and cost for installing new radio nodes as anchors for position estimation for terminals.

A plurality of lighting fixtures is installed on, for example, the ceiling. Thus, when all lighting fixtures are used as anchors, the amount of information transmitted and received to and from lighting fixtures for the position estimation for terminals becomes enormous; as a result, the time required for estimation of a position (hereinafter may be also referred to as "position estimation") of the terminal increases. In this case, estimating a position of a mobile terminal is difficult. The present embodiment shortens the time required for position estimation for a terminal, using the lighting fixtures supporting radio communication. Thus, for example, it is possible to estimate the position of the mobile terminal.

EMBODIMENT

Position Estimation System

Figure 1:
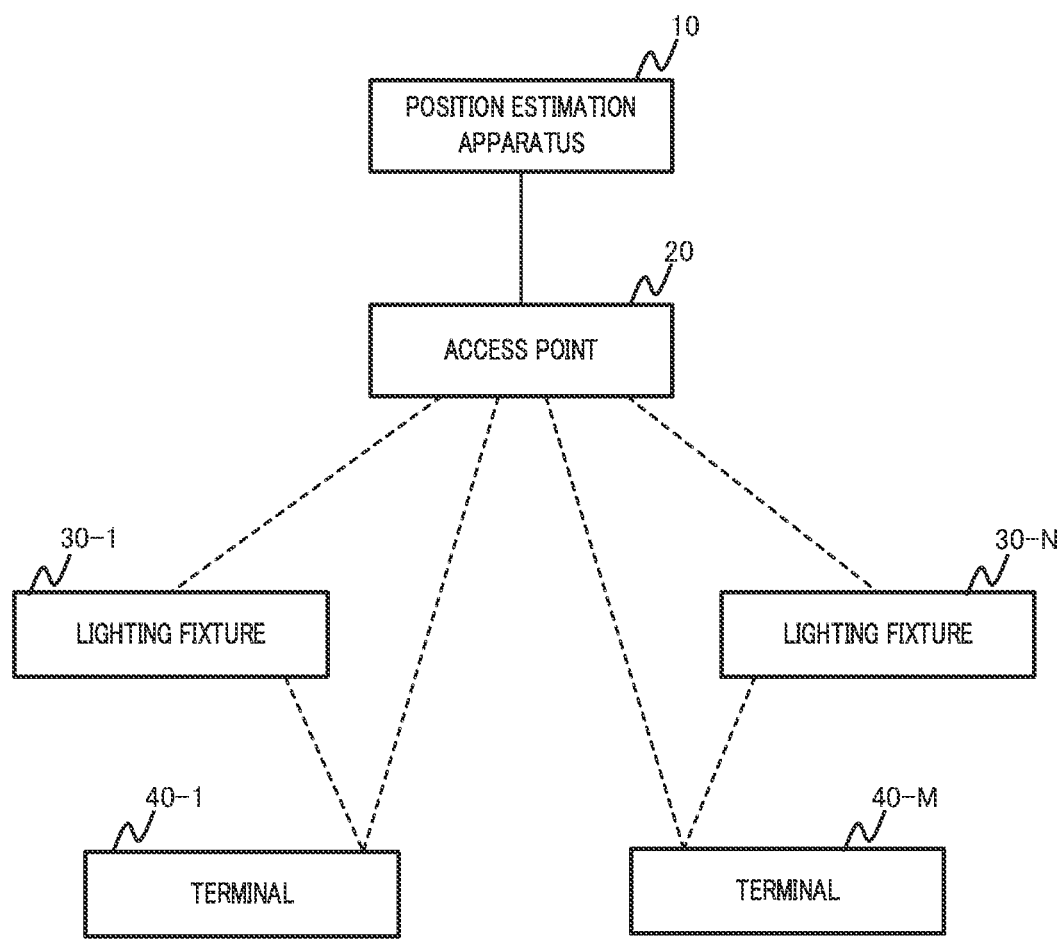
FIG. 1 illustrates a configuration example of a position estimation system according to an embodiment.

FIG. 1 illustrates a configuration example of position estimation system 1. Position estimation system 1 is a system for estimating a position of a terminal. Position estimation system 1 is installed in commercial facilities such as convenience stores or home improvement centers, for example.

Position estimation system 1 includes position estimation apparatus 10, access point 20, a plurality of lighting fixtures 30, and a plurality of terminals 40. Incidentally, when distinguishing among the plurality of lighting fixtures 30, they may be referred to as lighting fixture 30-1, . . . , 30-N(N is an integer of two or more). Moreover, when distinguishing among the plurality of terminals 40, they may be referred to as terminal 40-1, . . . , 40-M (M is an integer of two or more).

Position estimation apparatus 10 is connected to access point 20 via a wired LAN or wireless LAN. Lighting fixture 30 is connected to access point 20 via the wireless LAN. Terminal 40 is connected to access point 20 via the wireless LAN. Thus, position estimation apparatus 10 can transmit and receive data to and from lighting fixture 30 and terminal 40 via access point 20.

Access point 20, lighting fixture 30, and terminal 40 support radio communication using the 920 MHz band. However, the radio communication with the 920 MHz band is merely an example, and radio communication of the present embodiment is not limited to this. For example, access point 20, lighting fixture 30, and terminal 40 may support radio communication using the 2.4 GHz band, the 5 GHz band, and/or the 60 GHz band (Wireless Gigabit (WiGig)).

Each lighting fixture 30 is installed on, for example, a predetermined position of the ceiling in the building. That is, an installation position of each lighting fixture 30 is known. Further, lighting fixture 30 supports the radio communication. For example, via the radio communication, operations such as turning on and off as well as dimming of lighting fixture 30 can be performed from the device at hand (e.g., remote controller). Incidentally, lighting fixture 30 in the present embodiment is an example of electric equipment. That is, in the present embodiment, any electric equipment installed in a predetermined position and capable of receiving a radio signal is acceptable. Examples of the electric equipment include, in addition to lighting fixture 30, air conditioning apparatus (e.g., air conditioner, electric fan), fire alarm, smoke detector, surveillance camera, emergency guidance light, and the like. The term "electric equipment" may be replaced with a "radio electronic device."

Terminal 40 supports the radio communication and is carried by a person in the building (e.g. employee or customer in the commercial facility). An example of terminal 40 includes a smart phone. However, terminal 40 is not limited to the smart phone and may be, for example, a dedicated terminal used by the employee for business. Terminal 40 is also not limited to that carried by the person and may be, for example, provided on a mobile object (e.g., cart, robot, or the like) that is movable in the commercial facility. Terminal 40 can be wirelessly connected to access point 20 in the building.

Position estimation apparatus 10 estimates a position of terminal 40 in a region where a plurality of lighting fixtures 30 are installed (hereinafter referred to as a "target region"). For example, position estimation apparatus 10 estimates the position of terminal 40 in the target region based on a received signal strength indicator of a radio signal transmitted from terminal 40, which is measured by a predetermined number of lighting fixtures 30 in the target region, and installation positions of the predetermined number of lighting fixtures 30. An example of position estimation apparatus 10 is a PC or a server. Further details of position estimation apparatus 10 will be described later.

Position Estimation Apparatus

Figure 2:
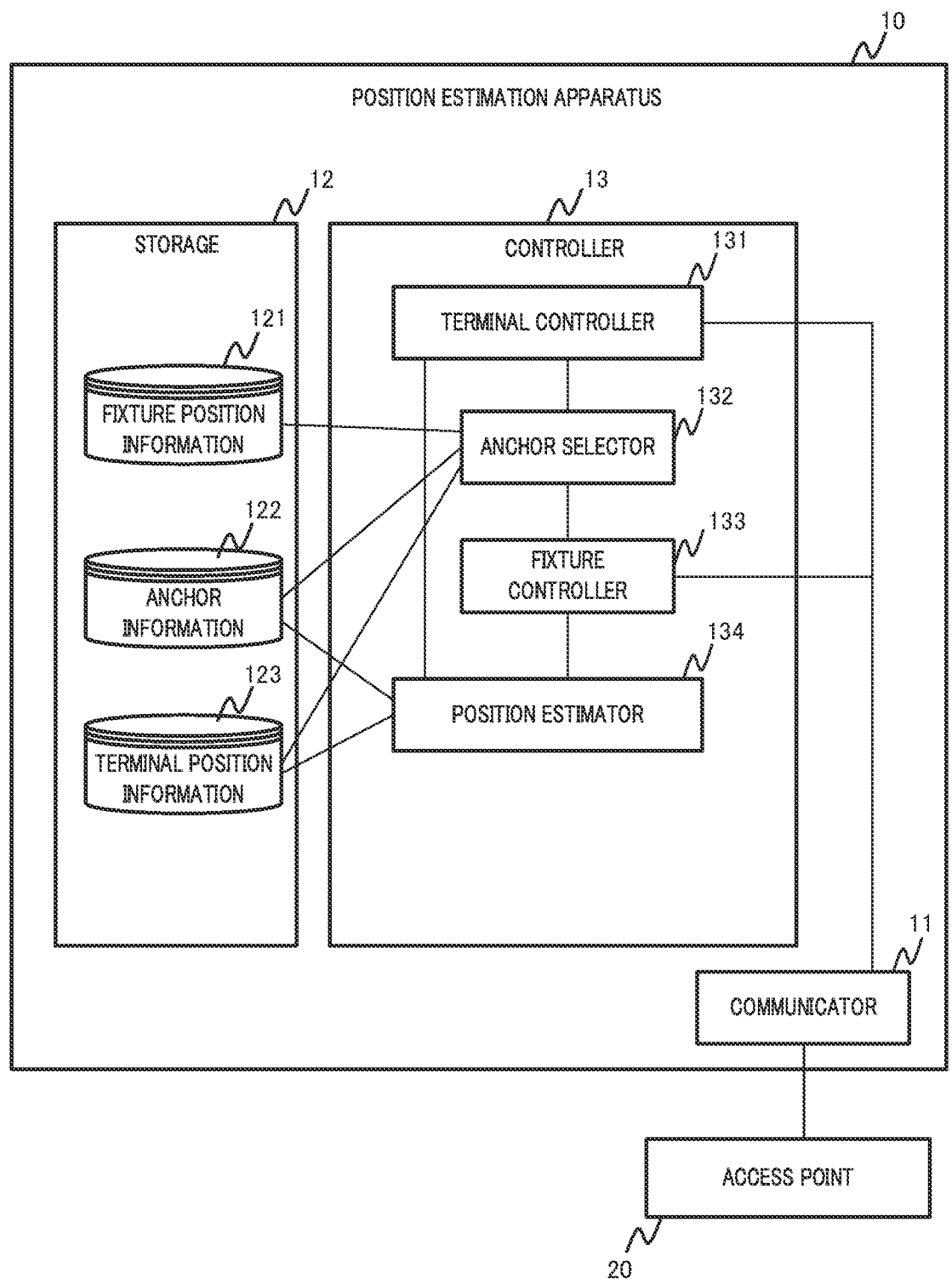
FIG. 2 illustrates a configuration example of a position estimation apparatus according to the embodiment.

FIG. 2 illustrates a configuration example of position estimation apparatus 10. Position estimation apparatus 10 includes communicator 11, storage 12, and controller 13.

Communicator 11 is, for example, a communication interface for the wired LAN or the wireless LAN. Communicator 11 processes transmission and reception of signals to and from lighting fixture 30 and terminal 40 via access point 20.

Storage 12 is, for example, a Hard Disk Drive (HDD), an Solid State Drive (SSD), and/or a flash memory. Storage 12 stores fixture position information 121 which is exemplary first information, anchor information 122, and terminal position information 123 which is exemplary second information. Incidentally, fixture position information 121, anchor information 122, and terminal position information 123 will be described later in detail (see FIGS. 5, 6, 7).

Controller 13 is, for example, a Central Processing Unit (CPU) or a controller. Controller 13 implements terminal controller 131, anchor selector 132, fixture controller 133, and position estimator 134 as functions of position estimation apparatus 10. These functions may be implemented by controller 13 executing a computer program.

Terminal controller 131 controls communication with terminal 40 via communicator 11 and access point 20.

Anchor selector 132 selects, as an anchor, lighting fixture 30 used for the position estimation for terminal 40 from among a plurality of lighting fixtures 30 in the target region. For example, anchor selector 132 selects the anchors based on fixture position information 121 and terminal position information 123 and stores a selection result as anchor information 122 in storage 12. Further details of anchor selection will be described later (see FIG. 10).

Fixture controller 133 controls communication with lighting fixture 30 via communicator 11 and access point 20.

Position estimator 134 instructs the anchor to measure of third information (e.g., received signal strength indicator (RSSI)) related to radio communication quality of the radio signal transmitted from terminal 40. Position estimator 134 estimates the position of terminal 40 based on the third information related to the radio communication quality of the radio signal measured at the anchors and positions of the anchors. Further details of position estimation for terminal 40 will be described later (see FIG. 11). Incidentally, position estimator 134 outputs an estimation result to a surveillance device (not illustrated) in order to use the result for optimizing a personnel arrangement and the number of employees in a case where terminal 40 is carried by the employee. Further, the surveillance device may know, from the estimation result, a traffic line of terminal 40 and use it for changing a store layout.

Lighting Fixture

Figure 3:
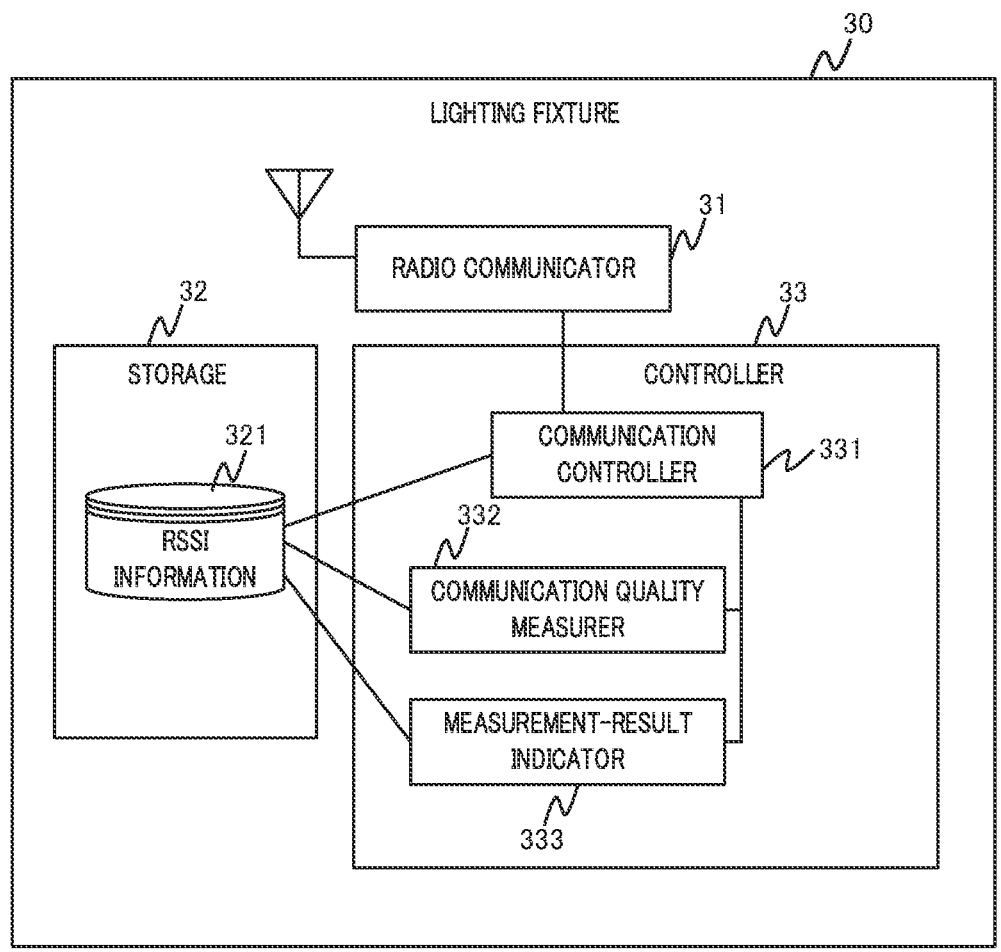
FIG. 3 illustrates a configuration example of a lighting fixture according to the embodiment.

FIG. 3 illustrates a configuration example of lighting fixture 30. Lighting fixture 30 includes radio communicator 31, storage 32, and controller 33.

Radio communicator 31 is, for example, a communication interface for the wireless LAN. Radio communicator 31 transmits and receives radio signals to and from position estimation apparatus 10 via access point 20. Radio communicator 31 also receives a radio signal transmitted from terminal 40.

Storage 32 is, for example, a flash memory. Storage 32 stores RSSI information 321. Further details of RSSI information 321 will be described later (see FIG. 8).

Controller 33 is, for example, a CPU or a controller. Controller 33 implements communication controller 331, communication quality measurer 332, and measurement-result indicator 333 as functions of lighting fixture 30. These functions may be implemented by controller 33 executing a computer program.

Communication controller 331 controls transmission and reception of radio signals to and from position estimation apparatus 10 via radio communicator 31 and access point 20. Communication controller 331 also controls reception of a radio signal transmitted from terminal 40 via radio communicator 31.

Communication quality measurer 332 measures the received signal strength indicator (e.g., RSSI) as one of pieces of the communication quality of the radio signal transmitted from terminal 40. Communication quality measurer 332 stores a measured received signal strength indicator as RSSI information 321 in storage 32.

Measurement-result indicator 333 transmits RSSI information 321 in storage 32 to position estimation apparatus 10 via radio communicator 31 and access point 20.

Terminal

Figure 4:
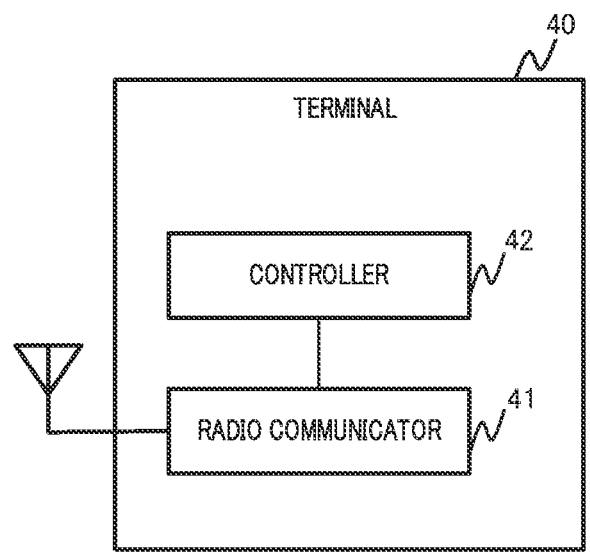
FIG. 4 illustrates a configuration example of a terminal according to the embodiment.

FIG. 4 illustrates a configuration example of terminal 40. Terminal 40 includes radio communicator 41 and controller 42.

Radio communicator 41 is, for example, a communication interface for the wireless LAN. Radio communicator 41 transmits and receives radio signals to and from position estimation apparatus 10 via access point 20.

Controller 42 is, for example, a CPU or a controller. When receiving an acknowledgment request (e.g., Keep-Alive request) from position estimation apparatus 10 via radio communicator 41, controller 42 transmits an acknowledgment response to the acknowledgment request via radio communicator 41. Lighting fixtures 30 selected as the anchors receive (e.g., intercept) a radio signal of this acknowledgment response and measure the received signal strength indicator.

Fixture Position Information

FIG. 5 illustrates an example of fixture position information 121. Fixture position information 121 is information indicating a position in which lighting fixture 30 is actually installed in the target region.

For example, fixture position information 121 associates fixture identifier 501, and installation position 502.
    Fixture identifier 501 is informational uniquely identifying lighting fixture 30.
    Installation position 502 is information indicating the position in which lighting fixture 30 having fixture identifier 501 is actually installed (e.g., coordinates).
    The example in FIG. 5 illustrates the following:
    Installation position 502 of lighting fixture 30 with fixture identifier 501 of "30-1" is (Xa1, Ya1).
    Installation position 502 of lighting fixture 30 with fixture identifier 501 of "30-2" is (Xa2, Ya2).

Anchor Information

Figure 6:
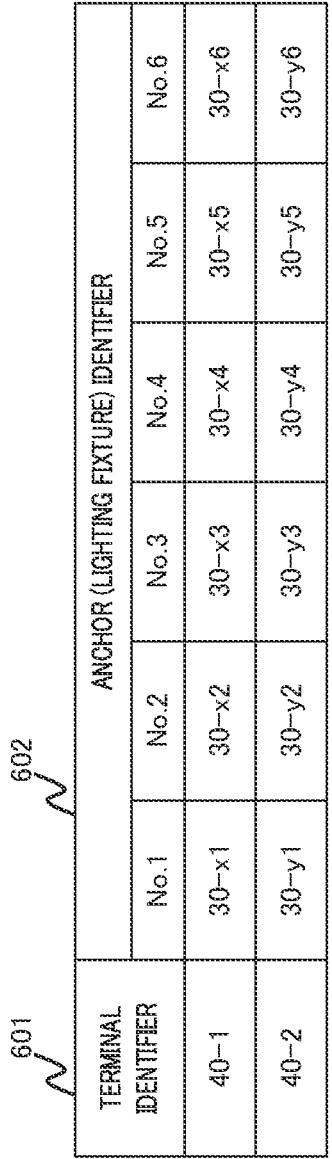
FIG. 6 illustrates an example of anchor information according to the embodiment.

FIG. 6 illustrates an example of anchor information 122. Anchor information 122 is information indicating lighting fixtures 30 selected as the anchors for position estimation for terminals 40 in the target region.

For example, anchor information 122 associates terminal identifier 601 and the identifiers of lighting fixtures 30 selected as the anchors (hereinafter referred to as "anchor identifier 602").
    The example in FIG. 6 illustrates the following:
    Identifiers (anchor identifiers) 602 of lighting fixtures 30 selected as the anchors for the position estimation for terminal 40 with terminal identifier 601 of "40-1" are, "30-$x1$," "30-$x2$," "30-$x3$," "30-$x4$," "30-$x5$," and "30-$x6$."
    Identifiers (anchor identifiers) 602 of lighting fixtures 30 selected as the anchors for the position estimation for terminal 40 with terminal identifier 601 of "40-2" are, "30-$y1$," "30-$y2$," "30-$y3$," "30-$y4$," "30-$y5$," and "30-$y6$."

In the manner described above, lighting fixtures 30 selected as the anchors may be different from each other for each terminal 40. Further, as described later, anchor information 122 may be updated whenever necessary in accordance with movement of terminal 40.

Terminal Position Information

Figure 7:
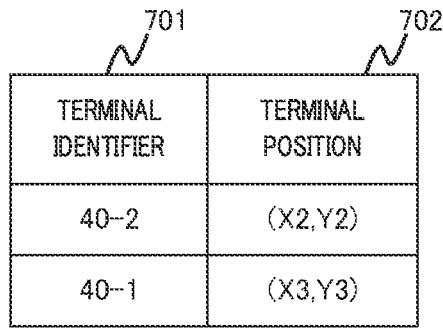
FIG. 7 illustrates an example of terminal position information according to the embodiment.

FIG. 7 illustrates an example of terminal position information 123. Terminal position information 123 is information indicating a position of terminal 40 in the target region.

For example, terminal position information 123 associates terminal identifier 701 and terminal position 702.
    Terminal identifier 701 is informational uniquely identifying terminal 40.
    Terminal position 702 is information indicating a position of terminal 40 with terminal identifier 701 (e.g., coordinates).
    The example in FIG. 7 illustrates the following:
    Terminal position 702 of terminal 40 with terminal identifier 701 of "40-2" is (X2, Y2).
    Terminal position 702 of terminal 40 with terminal identifier 701 of "40-1" is (X3, Y3).

RSSI Information

Figure 8:
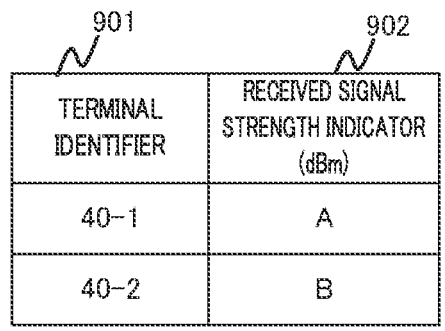
FIG. 8 illustrates an example of Received Signal Strength Indicator (RSSI) information according to the embodiment.

FIG. 8 illustrates an example of RSSI information 321. Note that, FIG. 8 illustrates information stored for each anchor (each lighting fixture 30) and may be transmitted with the anchor identifier of the transmission source when being transmitted to position estimation apparatus 10. RSSI information 321 is information indicating the received signal strength indicator of the radio signal transmitted from terminal 40, which is measured by lighting fixture 30.

For example, RSSI information 321 may associate terminal identifier 901 and RSSI measurement value 902.

Terminal identifier 901 is informational uniquely identifying terminal 40.

RSSI measurement value 902 indicates the received signal strength indicator of the radio signal transmitted from terminal 40 with terminal identifier 901.

The example in FIG. 8 illustrates the following:

RSSI measurement value 902 of the radio signal transmitted from terminal 40 with terminal identifier 901 of "40-1" is "A (dBm)."

RSSI measurement value 902 of the radio signal transmitted from terminal 40 with terminal identifier 901 of "40-2" is "B (dBm)."

Processing of Lighting Fixture

Figure 9:
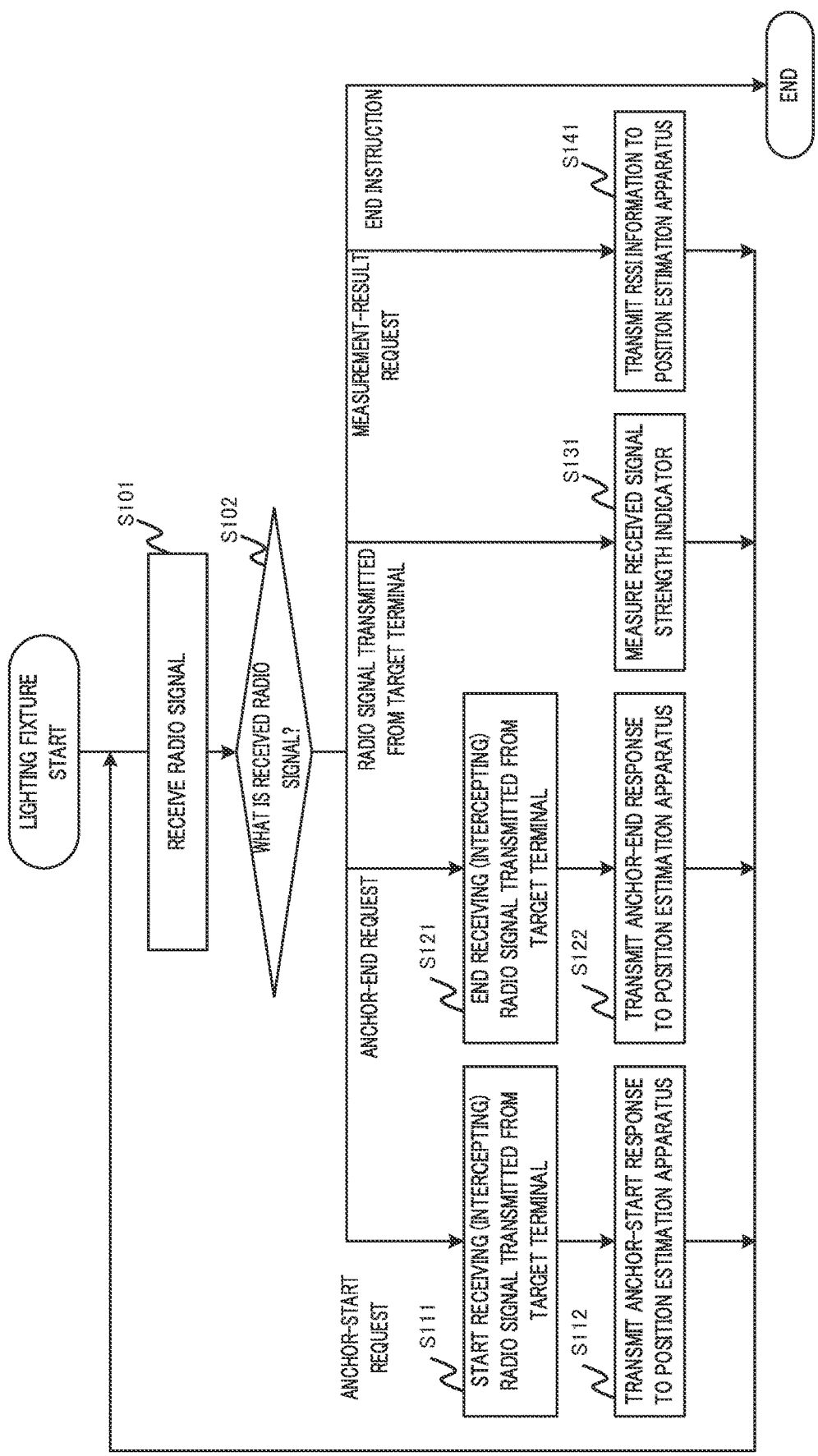
FIG. 9 is a flowchart illustrating exemplary processing of the lighting fixture according to the embodiment.

Next, with reference to a flowchart illustrated in FIG. 9, exemplary processing of lighting fixture 30 will be described.

Communication controller 331 receives a radio signal via radio communicator 31 (S101).

Communication controller 331 determines whether the radio signal received in S101 corresponds to any one of an anchor-start request transmitted from position estimation apparatus 10, an anchor-end request transmitted from position estimation apparatus 10, a radio signal transmitted from terminal 40 that is a target for position estimation, a measurement-result request transmitted from position estimation apparatus 10, and an end instruction transmitted from position estimation apparatus 10 (S102).

In a case where the radio signal received in S101 is an anchor-start request transmitted from position estimation apparatus 10 (S102: anchor-start request), communication controller 331 start receiving (e.g., intercepting) the radio signal transmitted from terminal 40 that is the target for position estimation (S111). Terminal 40 that is the target for position estimation to be intercepted may be indicated (identified) for communication controller 331 based on the information included in the anchor-start request (e.g., terminal identifier). Communication controller 331 then transmits an anchor-start response to position estimation apparatus 10 (S112) and returns to the process in S101.

In a case where the radio signal received in S101 is an anchor-end request transmitted from position estimation apparatus 10 (S102: anchor-end request), communication controller 331 ends receiving (e.g., intercepting) the radio signal transmitted from terminal 40 of interest (hereinafter may be referred to as "target terminal 40") (S121). Communication controller 331 then transmits an anchor-end response to position estimation apparatus 10 (S122) and returns to the process in S101.

In a case where the radio signal received in S101 is a radio signal transmitted from terminal 40 of interest (hereinafter may be referred to as "target terminal 40") (S102: radio signal transmitted from target terminal), communication controller 331 measures a received signal strength indicator of the radio signal and stores, in storage 32, a measurement result as RSSI information 321 (S131). Then, communication controller 331 returns to the process in S101.

In a case where the radio signal received in S101 is a measurement-result request transmitted from position estimation apparatus 10 (S102: measurement-result request), communication controller 331 transmits RSSI information 321 in storage 32 to position estimation apparatus 10 (S141). Then, controller 33 returns to the process in S101.

In a case where the radio signal received in S101 is an end instruction transmitted from position estimation apparatus 10 (S102: end instruction), communication controller 331 ends this processing.

In the manner described above, lighting fixture 30 that has received the anchor-start request measures the received signal strength indicator of the radio signal transmitted by terminal 40 that is the target for position estimation and transmits the measurement result to position estimation apparatus 10, as an anchor of target terminal 40 until receiving the anchor-end request.

Processing of Position Estimation Apparatus

Next, with reference to a flowchart illustrated in FIG. 10, exemplary processing of position estimation apparatus 10 will be described.

For example, when entering the target region, terminal 40 transmits a connection request to access point 20. Terminal controller 131 receives the connection request from terminal 40 via access point 20 (S201).

Anchor selector 132 selects, from among a plurality of lighting fixtures 30 in the target region, lighting fixtures 30 of anchor-selection number a as the anchors used for the position estimation for terminal 40 that has transmitted the connection request (i.e., target terminal of position estimation) (S202). Anchor-selection number a may be a predetermined number and may be determined based on, for example, the size of the target region or position-estimation accuracy that is required. In addition, the anchors in S202 may be selected at random. Anchor selector 132 stores, in storage 12 as anchor information 122, identifiers of lighting fixtures 30 selected as the anchors.

Fixture controller 133 transmits, via access point 20, an anchor-start request to lighting fixture(s) 30 selected as the anchor(s) in S202 (S203). Processing of lighting fixture 30 that has received the anchor-start request is as described in FIG. 9.

Fixture controller 133 determines whether the anchor start responses have been received from all of lighting fixtures 30 that are the transmission destinations of the anchor start request (S205).

Fixture controller 133 determines whether the anchor start responses have been received from all of lighting fixtures 30 that are the transmission destinations of the anchor start request (S205).

When not receiving the anchor start response from at least one lighting fixture 30 of lighting fixtures 30 that are the transmission destinations of the anchor start request (S205: NO), controller 13 returns to the process in S204.

When receiving the anchor start responses from all of lighting fixtures 30, from among lighting fixtures 30 that are the transmission destinations of the anchor start requests (S205: YES), position estimator 134 performs a position-estimation process for target terminal 40 (S206). Further details of the position-estimation process will be described later (see FIG. 11).

Anchor selector 132 reselects, as the anchors, lighting fixtures 30 of anchor-selection number a that is installed in the vicinity of a position of target terminal 40 estimated in S206 (S207). That is, the anchors selected in S202 are not selected considering the position of target terminal 40. For example, in S207, anchor selector 132 selects with priority, as the anchors, lighting fixtures 30 closer to the position of target terminal 40 in distance. In S207, anchor selector 132 may select, as the anchors, lighting fixtures 30 in order from the closer side to the position of target terminal 40 in distance. Alternatively, in S207, anchor selector 132 may select the anchors at random from among lighting fixtures 30 installed within a range with a predetermined radius from the position of target terminal 40.

Anchor selector 132 retransmits the anchor-start request to lighting fixtures 30 reselected as the anchors of target terminal 40 in S207 (S208). For example, anchor selector 132 may transmit the anchor-start request to lighting fixtures 30 not registered in the anchor information generated in S202 from among lighting fixtures 30 selected as the anchors of target terminal 40 in S207.

Anchor selector 132 transmits the anchor-end request to lighting fixtures 30 not selected as the anchors of target terminal 40 of this time (S207) from among lighting fixtures 30 selected as the anchors of target terminal 40 of the last time (S202) (S209). For example, anchor selector 132 transmits the anchor-end request to lighting fixtures 30 not selected as the anchors in S207 from among lighting fixtures 30 registered as the anchors of target terminal 40 in the anchor information.

Anchor selector 132 updates the anchor information (S210). For example, anchor selector 132 registers identifiers of lighting fixtures 30 newly selected as the anchors of target terminal 40 of this time (S207) in the anchor information and deletes, from the anchor information, identifiers of lighting fixtures 30 not selected as the anchors of target terminal 40 of this time from among lighting fixtures 30 selected as the anchors of target terminal 40 of the last time (S202). Thus, controller 13 return to the process in S204.

Position-Estimation Process

Next, with reference to a flowchart illustrated in FIG. 11, an exemplary position-estimation process will be described. This process corresponds to the process in S206 in FIG. 10.

Position estimator 134 transmits an acknowledgment request to target terminal 40 via access point 20 (S401). An example of the acknowledgment request is a Keep-Alive signal for confirming that target terminal 40 is alive. Target terminal 40 that has received the acknowledgment request transmits a radio signal serving as an acknowledgment response. Lighting fixtures 30 selected as the anchors receive (e.g., intercept) the radio signal of this acknowledgment response and measure the received signal strength indicator.

Position estimator 134 receives the acknowledgment response transmitted from target terminal 40 via access point 20 (S402).

Position estimator 134 transmits a measurement-result request to lighting fixtures 30 selected as the anchors of target terminal 40 (S403). As illustrated in FIG. 9, lighting fixtures 30 that have received the measurement-result request transmit RSSI information 321 to position estimation apparatus 10.

Position estimator 134 receives RSSI information 321 from lighting fixtures 30 selected as the anchors of target terminal 40 (S404).

Position estimator 134 estimates the position of target terminal 40 based on the installation position of each of lighting fixtures 30 selected as the anchors of target terminal 40 and RSSI information 321 received from each of lighting fixtures 30 in S404 (S405). For example, position estimator 134 calculates distances from the respective installation positions of at least three lighting fixtures 30 selected as the anchors to target terminal 40, using the received signal strength indicators, and thereby estimates the position of target terminal 40, using trilateration. Then, the position-estimation process is completed.

Position estimator 134 stores the position of target terminal 40 estimated in S405 as terminal position information 123 in storage 12 (S406). Then, the position-estimation process is completed.

In the manner described above, position estimation apparatus 10 estimates the position of target terminal 40 based on the installation positions of a plurality of lighting fixtures 30 selected as the anchors and the received signal strength indicators of the radio signal transmitted by target terminal 40, which is measured by the plurality of lighting fixtures 30.

Exemplary Anchor Selection

Figure 12:
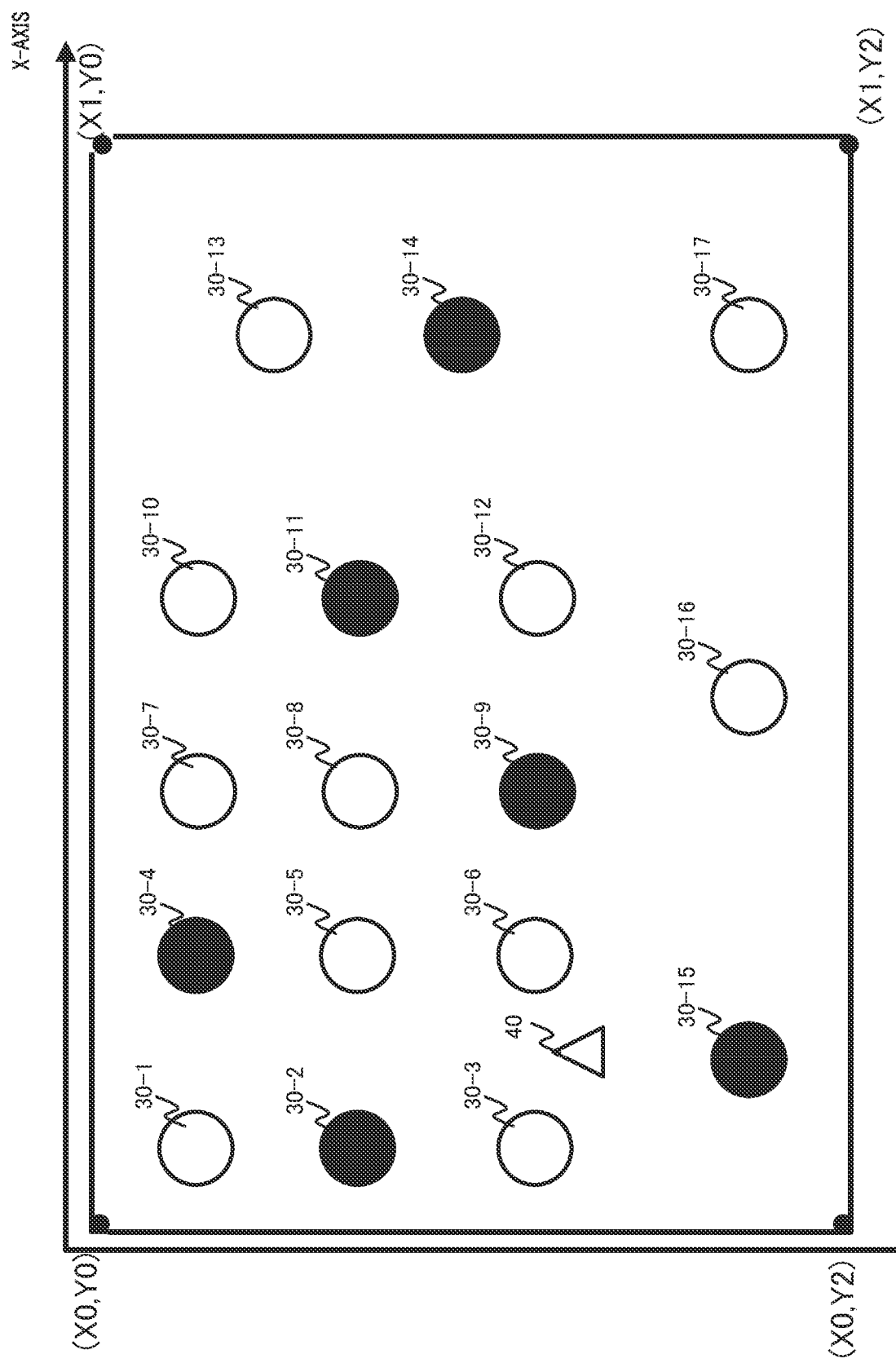
FIG. 12 is a diagram for describing the first example of anchor selection according to the embodiment.
Figure 13:
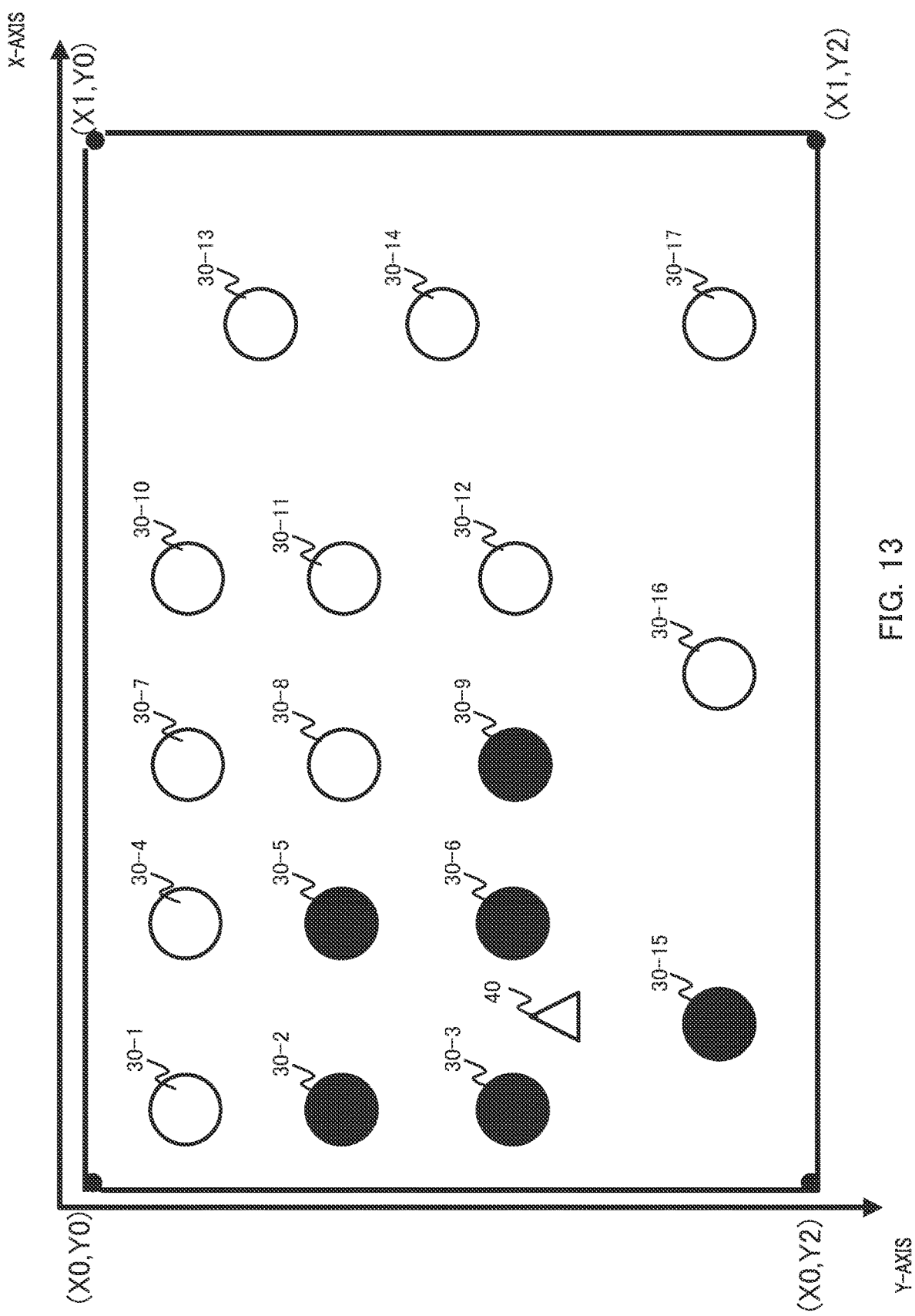
FIG. 13 is a diagram for describing the second example of the anchor selection according to the embodiment.

Exemplary anchor selection will be described with reference to FIGS. 12 and 13. FIGS. 12 and 13 illustrate an example in which a plurality of lighting fixtures 30-1, . . . , 30-17 are installed on the ceiling of a commercial facility such as a convenience store or home improvement center. In FIGS. 12 and 13, a position is expressed by two-dimensional coordinates consisting of an X-axis and a Y-axis. However, expression of the position according to the present embodiment is not limited to these two-dimensional coordinates.

In FIGS. 12 and 13, a rectangular region having vertices of points (X0, Y0), points (X1, Y0), points (X1, Y2), and point (X0, Y2) indicates a movable region within which target terminal 40 can move. In the following, a description will be given with a case where anchor-selection number a is six.

Figure 10:
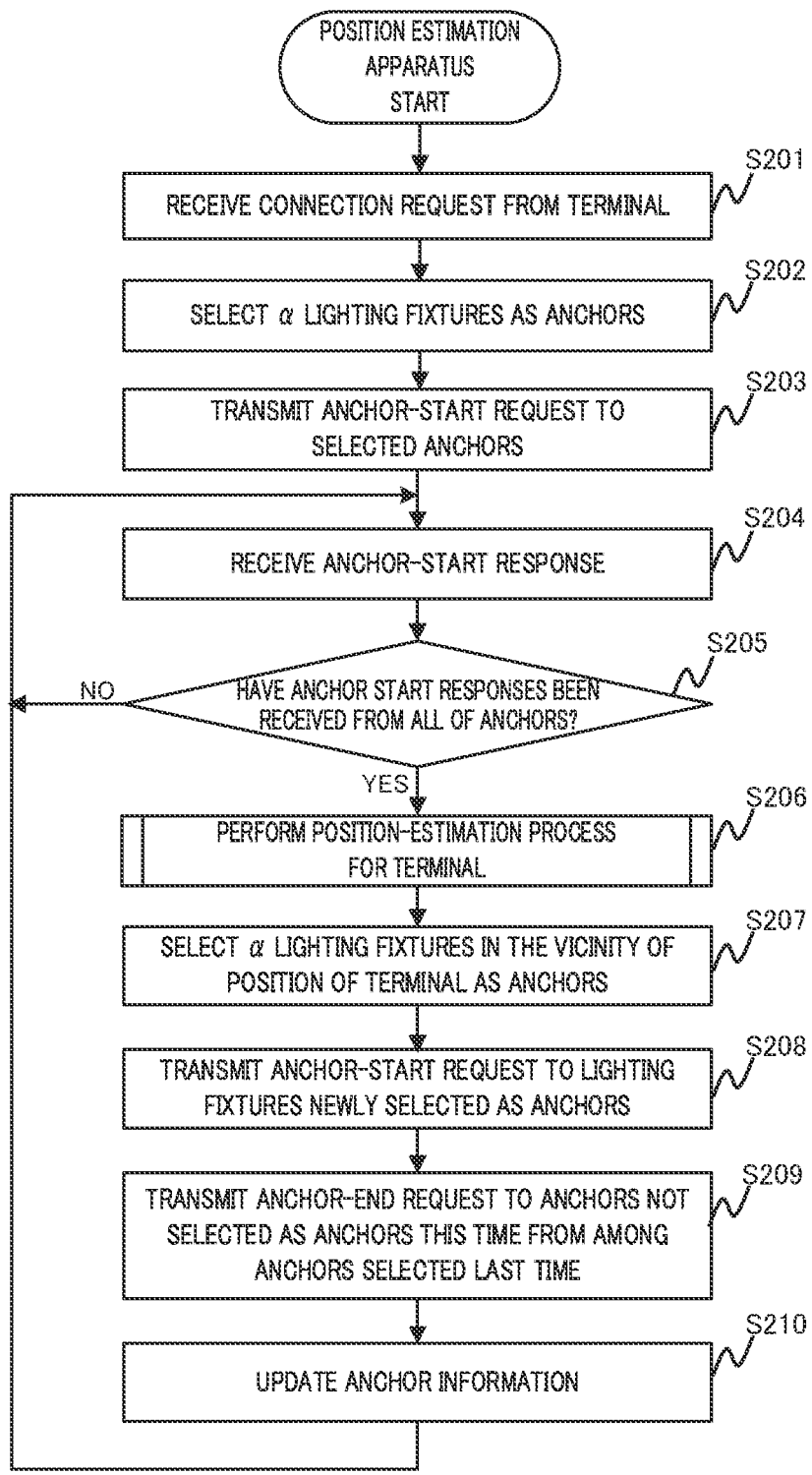
FIG. 10 is a flowchart illustrating exemplary processing of the position estimation apparatus according to the embodiment.
Figure 11:
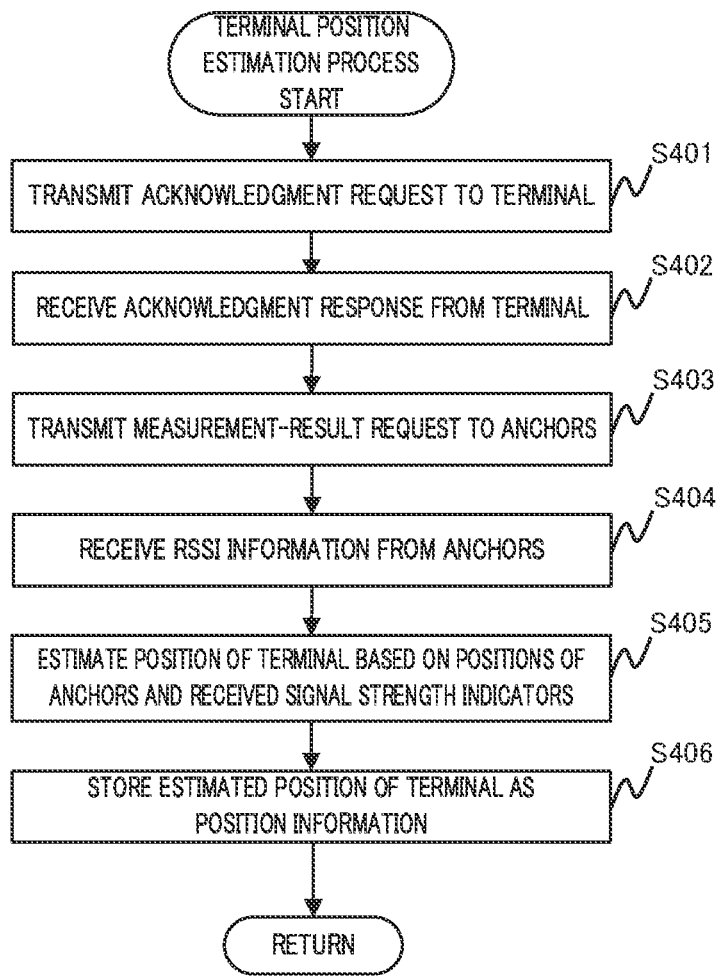
FIG. 11 is a flowchart illustrating an exemplary position-estimation process according to the embodiment.

For example, as illustrated in FIG. 12, anchor selector 132 selects, in S202 in FIG. 10, six lighting fixtures 30-2, 30-4, 30-9, 30-11, 30-14, and 30-15 as the anchors at random from among lighting fixtures 30 in the target region (see lighting fixtures 30 of black circles).

In S206 in FIG. 10, anchor selector 132 estimates the position of target terminal 40 based on the received signal strength indicator of the radio signal transmitted by target terminal 40 and measured by six lighting fixtures 30-2, 30-4, 30-9, 30-11, 30-14, and 30-15 selected as the anchors. The estimated position of target terminal 40 is stored in storage 12 as terminal position information 123.

Anchor selector 132 refers to terminal position information 123 and specifies the position of target terminal 40. Then, as illustrated in FIG. 13, anchor selector 132 reselects, in S207 in FIG. 10 as the anchors of target terminal 40, six lighting fixtures 30-2, 30-3, 30-5, 30-6, 30-9, and 30-15 present in the vicinity of the specified position of target terminal 40. For example, anchor selector 132 reselects, as the anchors of target terminal 40, six lighting fixtures 30 in order from the closer side to the position of target terminal 40 in distance. These lighting fixtures 30 reselected as the anchors are used for the position estimation for target terminal 40 in the position-estimation process in S206 the next time.

In the manner described above, according to the present embodiment, lighting fixtures 30 in the vicinity of target terminal 40 are reselected as the anchors. Thus, even when target terminal 40 moves, lighting fixtures 30 in the vicinity of target terminal 40 are reselected as the anchors whenever necessary in accordance with the movement.

In the commercial facility such as convenience store or home improvement center, visibility between target terminal 40 and each of lighting fixtures 30 is not necessarily good. In one example, a blocking object such as a tall shelf may be present between target terminal 40 and lighting fixture 30.

Thus, in a case where the anchors are reselected at random, lighting fixture 30 with the blocking object in between with target terminal 40 may be reselected as the anchors. When these lighting fixture 30 does not function as the anchor, the position-estimation accuracy for target terminal 40 may be degraded. Such degradation remarkably occurs when, for example, a person hangs terminal 40 from his/her neck, that is, terminal 40 is present at a position lower than the blocking object.

By contrast, in the present embodiment, lighting fixtures 30 in the vicinity of target terminal 40 are reselected as the anchors; as a result, a possibility of lighting fixture 30 with the blocking object in between with target terminal 40 being reselected as the anchors is lowered. Thus, the present embodiment can ensure the position-estimation accuracy for target terminal 40.

In addition, since lighting fixtures 30 in the vicinity of target terminal 40 are reselected as the anchors, regardless of the direction in which target terminal 40 moves, there is a high possibility that anchors are present close to the destination of target terminal 40. Thus, the position-estimation accuracy in the destination of target terminal 40 can be ensured.

Summary of Present Disclosure

Position estimation apparatus 10 according to the present embodiment includes: a selection circuit (e.g., anchor selector 132) that selects, as anchors, at least two of a plurality of radio electronic devices (e.g., lighting fixtures 30) arranged in a region and updates the selected anchors based on first information (e.g., fixture position information 121) and second information, the anchors being used for position estimation for a mobile terminal (e.g., terminal 40), the first information being related to an arrangement of the plurality of radio electronic devices, the second information being related to a first position resulting from estimation of a position of the mobile terminal in the region, using the selected anchors; and an estimation circuit (e.g., position estimator 134) that estimates the first position of the mobile terminal based on third information (e.g., RSSI information 321) related to radio communication quality between the selected anchors and the mobile terminal and on the first information related to the selected anchors, and estimates a second position of the mobile terminal based on fourth information (e.g., RSSI information 321) related to radio communication quality between the updated anchors and the mobile terminal and on the first information related to the updated anchors.

According to this configuration, since the anchors selected based on the first position of terminal 40 (e.g., position of the last time) is used for estimation of the second position of terminal 40 (e.g., position of this time), the time required for the position estimation can be shortened as compared with a case of estimating the position of terminal 40 by using all of lighting fixtures 30.

The selection circuit may select the anchors in order of the plurality of radio electronic devices closer to the first position of the mobile terminal in distance.

According to this configuration, there is a high possibility that the anchors are present close to the destination of the mobile terminal, and thus, it is possible to suppress degradation of the position-estimation accuracy in the destination of the mobile terminal.

In a case where the updated anchors include anchors not included in the selected anchors, the selection circuit may instruct to start measuring of the received signal strength indicator of the radio signal transmitted from the mobile terminal (e.g., anchor-start request).

According to this configuration, the anchors newly selected for estimation of the second position are instructed to start measuring, and thus, it is possible to reduce a communication traffic between position estimation apparatus 10 and each of the radio electronic devices.

The selection circuit may instruct the anchors not included in the updated anchors from among the selected anchors to end measuring of the received signal strength indicator of the radio signal transmitted from the mobile terminal (e.g., anchor-end request).

According to this configuration, the anchors selected for estimation of the first position and not selected for estimation of the second position are instructed to end measuring, and thus, it is possible to reduce a communication traffic between position estimation apparatus 10 and each of the radio electronic devices.

Each of the radio electronic device may be a lighting fixture operable by a radio signal. The radio communication quality may be a received signal strength indicator (e.g., RSSI) of the radio signal transmitted from the mobile terminal.

Although various embodiments have been described above with reference to the drawings, it goes without saying that the present disclosure is not limited to foregoing embodiments. It is obvious that those skilled in the art can conceive various modifications or variations within the scope recited in the claims, and such modifications and variations also naturally fall within the technical scope of the present disclosure. Further, any components in the embodiments described above may be combined as appropriate without departing from the gist of the present disclosure.

The present disclosure can be realized by software, hardware, or software in cooperation with hardware.

In the description described above, " . . . er (or)" and "section" used for each component may be replaced with other terms such as " . . . circuit (circuitry)," " . . . device," " . . . unit," and " . . . module."

Each functional block used in the description of each embodiment described above can be partly or entirely realized by an LSI such as an integrated circuit, and each process described in the each embodiment may be controlled partly or entirely by the same LSI or a combination of LSIs. The LSI may be individually formed as chips, or one chip may be formed so as to include a part or all of the functional blocks. The LSI may include a data input and output coupled thereto. The LSI here may be referred to as an IC, a system LSI, a super LSI, or an ultra LSI depending on a difference in the degree of integration.

However, the technique of implementing an integrated circuit is not limited to the LSI and may be realized by using a dedicated circuit, a general-purpose processor, or a special-purpose processor. In addition, a FPGA (Field Programmable Gate Array) that can be programmed after the manufacture of the LSI or a reconfigurable processor in which the connections and the settings of circuit cells disposed inside the LSI can be reconfigured may be used. The present disclosure can be realized as digital processing or analogue processing.

If future integrated circuit technology replaces LSIs as a result of the advancement of semiconductor technology or other derivative technology, the functional blocks could be integrated using the future integrated circuit technology. Biotechnology can also be applied.

The present disclosure can be realized by any kind of apparatus, device or system having a function of communication, which is referred to as a communication apparatus. Some non-limiting examples of such a communication apparatus include a phone (e.g, cellular (cell) phone, smart phone), a tablet, a personal computer (PC) (e.g, laptop, desktop, netbook), a camera (e.g, digital still/video camera), a digital player (digital audio/video player), a wearable device (e.g, wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication apparatus is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)."

The communication may include exchanging data through, for example, a cellular system, a radio base station backhaul line a wireless LAN system, a satellite system, etc., and various combinations thereof.

The communication apparatus may comprise a device such as a controller or a sensor which is coupled to a communication device performing a function of communication described in the present disclosure. For example, the communication apparatus may comprise a controller or a sensor that generates control signals or data signals which are used by a communication device performing a communication function of the communication apparatus.

The communication apparatus also may include an infrastructure facility, such as a base station, an access point, and any other apparatus, device or system that communicates with or controls apparatuses such as those in the above non-limiting examples.

The disclosure of Japanese Patent Application No. 2019-143113, filed on Aug. 2, 2019 including the specification, drawings and abstract, are incorporated herein by reference in its entirety.

INDUSTRIAL APPLICABILITY

The present disclosure is useful for estimating positions of terminals in buildings.

REFERENCE SIGNS LIST

1 Position estimation system
10 Position estimation apparatus
11 Communicator
12 Storage
13 Controller
20 Access point
30 Lighting fixture
31 Radio communicator
32 Storage
33 Controller
40 Terminal
41 Radio communicator
42 Controller
121 Fixture position information
122 Anchor information
123 Terminal position information
131 Terminal controller
132 Anchor selector
133 Fixture controller
134 Position estimator
321 RSSI information
331 Communication controller
332 Communication quality measurer
333 Measurement-result indicator

The invention claimed is:

1. A position estimation apparatus, comprising:
a selection circuit, which, in operation:
randomly selects, as initial anchors, at least two of a plurality of radio electronic devices arranged in a region;
selects anchors from the plurality of radio electronic devices based on first information and second information; and
selects updated anchors by adding anchors newly selected based on the first information and the second information to the initial anchors and deleting anchors which were not selected based on the first information and the second information from the initial anchors, the initial anchors being used for position estimation for a mobile terminal, the first information being related to an arrangement of the plurality of radio electronic devices, the second information being related to a first position resulting from estimation of a position of the mobile terminal in the region, using the selected initial anchors; and
an estimation circuit, which, in operation:
estimates the first position of the mobile terminal based on third information related to a first received signal strength indicator (RSSI) and on the first information related to the selected initial anchors; and
estimates a second position of the mobile terminal based on fourth information related to a second RSSI and on the first information related to the updated anchors, the first RSSI being obtained by the selected initial anchors intercepting communications between the position estimation apparatus and the mobile terminal, and the second RSSI being obtained by the updated anchors intercepting communications between the position estimation apparatus and the mobile terminal.

2. The position estimation apparatus according to claim 1, wherein the selection circuit selects the updated anchors in order of the plurality of radio electronic devices closer to the first position of the mobile terminal in distance.

3. The position estimation apparatus according to claim 1, wherein, the selection circuit instructs the newly selected anchors among the updated anchors to start measuring of a RSSI of a radio signal transmitted from the mobile terminal.

4. The position estimation apparatus according to claim 1, wherein the selection circuit instructs at least one anchor not included in the updated anchors from among the selected initial anchors to end measuring of a RSSI of a radio signal transmitted from the mobile terminal.

5. The position estimation apparatus according to claim 1, wherein at least one of the plurality of radio electronic devices is a lighting fixture operable by a radio signal.

6. A position estimation system, comprising:
a plurality of radio electronic devices arranged in a region; and
a position estimation apparatus, which, in operation, performs processing including:
randomly selecting, as initial anchors, at least two of the plurality of radio electronic devices;
selecting anchors from the plurality of radio electronic devices based on first information and second information;
selecting updated anchors by adding anchors newly selected based on the first information and the second information to the initial anchors and deleting anchors which were not selected based on the first information and the second information from the initial anchors, the initial anchors being used for position estimation for a mobile terminal, the first information being related to an arrangement of the plurality of radio electronic devices, the second information being related to a first position resulting from estimation of a position of the mobile terminal in the region, using the selected initial anchors;

estimating the first position of the mobile terminal based on third information related to a first received signal strength indicator (RSSI) and on the first information related to the selected initial anchors; and estimating a second position of the mobile terminal based on fourth information related to a second RSSI and on the first information related to the updated anchors, the first RSSI being obtained by the selected initial anchors intercepting communications between the position estimation apparatus and the mobile terminal, and the second RSSI being obtained by the updated anchors intercepting communications between the position estimation apparatus and the mobile terminal.

7. A position estimation method, comprising:

randomly selecting, by a position estimation apparatus, at least two of a plurality of radio electronic devices, as initial anchors used for position estimation for a mobile terminal, the plurality of radio electronic devices being arranged in a region;

selecting, by the position estimation apparatus, anchors from the plurality of electronic devices based on first information and second information, the first information being related to an arrangement of the plurality of radio electronic devices, the second information being related to a first position resulting from estimation of a position of the mobile terminal in the region, using the selected initial anchors;

selecting, by the position estimation apparatus, updated anchors by adding anchors newly selected based on the first information and the second information to the initial anchors and deleting anchors which were not selected based on the first information and the second information from the initial anchors;

estimating, by the position estimation apparatus, the first position of the mobile terminal based on third information related to a first received signal strength indicator (RSSI) obtained by the selected initial anchors intercepting communications between the position estimation apparatus and the mobile terminal and on the first information related to the selected initial anchors; and estimating, by the position estimation apparatus, a second position of the mobile terminal based on fourth information related to quality a second RSSI obtained by the updated anchors intercepting communications between the position estimation apparatus and the mobile terminal and on the first information related to the updated anchors.

* * * * *